United States Patent
Ignatchenko et al.

(10) Patent No.: US 10,085,136 B2
(45) Date of Patent: *Sep. 25, 2018

(54) SYSTEMS, METHODS AND APPARATUSES FOR ENSURING PROXIMITY OF WIFI COMMUNICATION DEVICES

(71) Applicant: OLogN Technologies AG, Triesen/FL (LI)

(72) Inventors: Sergey Ignatchenko, Innsbruck (AT); Georgii Ignatchenko, Vienna (AT)

(73) Assignee: OLogn Technologies AG, Trieser/FL (LI)

( * ) Notice: Subject to any disclaimer, the term of this patent is extended or adjusted under 35 U.S.C. 154(b) by 13 days.

This patent is subject to a terminal disclaimer.

(21) Appl. No.: 15/289,456

(22) Filed: Oct. 10, 2016

(65) Prior Publication Data
US 2017/0099569 A1    Apr. 6, 2017

Related U.S. Application Data

(63) Continuation of application No. 14/274,219, filed on May 9, 2014, now Pat. No. 9,467,798.
(Continued)

(51) Int. Cl.
*H04W 4/00* (2018.01)
*H04W 4/80* (2018.01)
(Continued)

(52) U.S. Cl.
CPC ............. *H04W 4/80* (2018.02); *H04L 5/16* (2013.01); *H04L 43/16* (2013.01); *H04W 4/008* (2013.01);
(Continued)

(58) Field of Classification Search
CPC .................... H04W 4/008; H04L 5/16
(Continued)

(56) References Cited

U.S. PATENT DOCUMENTS

| 5,673,293 A | 9/1997 | Scarpa et al. |
| 5,864,624 A | 1/1999 | Lukas et al. |

(Continued)

FOREIGN PATENT DOCUMENTS

| EP | 2 071 787 A1 | 6/2009 |
| WO | WO 2007/029863 A1 | 3/2007 |
| WO | WO 2011/131745 A1 | 10/2011 |

OTHER PUBLICATIONS

U.S. Appl. No. 61/623,861, filed Apr. 13, 2012, Ignatchenko.
(Continued)

*Primary Examiner* — Mark Rinehart
*Assistant Examiner* — Peter G Solinsky
(74) *Attorney, Agent, or Firm* — Arnold & Porter Kaye Scholer LLP

(57) ABSTRACT

The systems, methods and apparatuses described herein provide an apparatus configured for ensuring proximity of a communication partner. In one aspect, the apparatus may comprise a communication port and a processor. The processor may be configured to send a request to and receive a response from the communication partner via the communication port using modulated signals, measure a time period between sending and receiving using timings of modulated signals' symbols, and receive a secondary value from the communication partner. The secondary value may be verified to include at least a portion of the request and a portion of the response, and may have been sent with authenticating data to authenticate it. The time period may be compared with a predefined threshold calculated based on a predefined maximum allowed distance to the communication partner. In another aspect, an apparatus may be configured to ensure its proximity to a communication partner.

14 Claims, 8 Drawing Sheets

Related U.S. Application Data

(60) Provisional application No. 61/821,962, filed on May 10, 2013.

(51) Int. Cl.

| | | |
|---|---|---|
| *H04L 12/26* | (2006.01) | |
| *H04W 12/06* | (2009.01) | |
| *H04L 5/16* | (2006.01) | |
| *H04W 84/12* | (2009.01) | |
| *H04L 27/34* | (2006.01) | |
| *H04L 27/26* | (2006.01) | |

(52) U.S. Cl.
CPC ......... *H04W 12/06* (2013.01); *H04L 27/2601* (2013.01); *H04L 27/265* (2013.01); *H04L 27/34* (2013.01); *H04W 84/12* (2013.01)

(58) Field of Classification Search
USPC ...................................................... 370/338
See application file for complete search history.

(56) References Cited

U.S. PATENT DOCUMENTS

| | | | |
|---|---|---|---|
| 6,058,121 | A | 5/2000 | Kim et al. |
| 6,853,616 | B1 | 2/2005 | Kim et al. |
| 6,976,168 | B1 | 12/2005 | Branstad et al. |
| 7,886,968 | B2 | 2/2011 | Shoemaker |
| 7,926,103 | B2 | 4/2011 | Aguilera et al. |
| 8,559,339 | B1 | 10/2013 | Talley et al. |
| 9,002,540 | B2 | 4/2015 | Ledendecker |
| 9,066,202 | B2 | 6/2015 | Dua et al. |
| 2003/0048811 | A1 | 3/2003 | Robie |
| 2004/0019785 | A1 | 1/2004 | Hawkes et al. |
| 2004/0039946 | A1 | 2/2004 | Smith et al. |
| 2004/0193918 | A1 | 9/2004 | Green et al. |
| 2004/0250074 | A1 | 12/2004 | Kilian-Kehr |
| 2004/0264372 | A1 | 12/2004 | Huang |
| 2005/0172333 | A1 | 8/2005 | Kim |
| 2005/0273608 | A1 | 12/2005 | Kamperman |
| 2006/0044108 | A1 | 3/2006 | Nowottnick |
| 2006/0239453 | A1 | 10/2006 | Halpern |
| 2006/0248340 | A1 | 11/2006 | Lee et al. |
| 2007/0058559 | A1 | 3/2007 | Xu |
| 2007/0217343 | A1 | 9/2007 | Znamova |
| 2007/0259693 | A1 | 11/2007 | Brunel et al. |
| 2007/0300070 | A1 | 12/2007 | Shen-Orr |
| 2008/0013640 | A1 | 1/2008 | Lu et al. |
| 2008/0031136 | A1 | 2/2008 | Gavette et al. |
| 2008/0157929 | A1 | 7/2008 | Hilgers et al. |
| 2009/0225669 | A1 | 9/2009 | Qin et al. |
| 2009/0275352 | A1 | 11/2009 | Kim et al. |
| 2009/0319656 | A1 | 12/2009 | Yang et al. |
| 2010/0008252 | A1 | 1/2010 | Alve |
| 2011/0078549 | A1 | 3/2011 | Thueringer et al. |
| 2011/0170532 | A1 | 7/2011 | Tchepnda et al. |
| 2011/0302653 | A1 | 12/2011 | Frantz et al. |
| 2012/0134687 | A1 | 5/2012 | Jones et al. |
| 2012/0151210 | A1 | 6/2012 | Perez |
| 2012/0307712 | A1 | 12/2012 | Watanabe |
| 2013/0010617 | A1 | 1/2013 | Chen et al. |
| 2013/0050080 | A1 | 2/2013 | Dahl et al. |
| 2013/0116964 | A1 | 5/2013 | van Roermund et al. |
| 2013/0208893 | A1 | 8/2013 | Shablygin et al. |
| 2013/0212704 | A1 | 8/2013 | Shablygin et al. |
| 2013/0276064 | A1 | 10/2013 | Ignatchenko |
| 2013/0283361 | A1 | 10/2013 | Rao et al. |
| 2013/0287011 | A1 | 10/2013 | Zhao |
| 2014/0074719 | A1 | 3/2014 | Gressel et al. |
| 2014/0082696 | A1 | 3/2014 | Danev et al. |
| 2014/0214687 | A1 | 7/2014 | Huxham |
| 2014/0223553 | A1 | 8/2014 | Gupta et al. |
| 2014/0274111 | A1 | 9/2014 | Edge et al. |
| 2014/0282875 | A1 | 9/2014 | Ignatchenko et al. |
| 2014/0282906 | A1 | 9/2014 | Ignatchenko et al. |
| 2014/0282907 | A1 | 9/2014 | Ignatchenko et al. |
| 2014/0282947 | A1 | 9/2014 | Ignatchenko et al. |
| 2014/0304798 | A1 | 10/2014 | Iyengar et al. |
| 2014/0334466 | A1 | 11/2014 | Ignatchenko et al. |
| 2015/0082427 | A1 | 3/2015 | Ivanchykhin et al. |
| 2015/0244685 | A1 | 8/2015 | Shah et al. |
| 2017/0078263 | A1 | 3/2017 | Ignatchenko et al. |

OTHER PUBLICATIONS

U.S. Appl. No. 61/792,996, filed Mar. 15, 2013, Ignatchenko.
U.S. Appl. No. 61/825,376, filed Mar. 20, 2013, Ignatchenko.
U.S. Appl. No. 15/274,290, filed Sep. 23, 2016, Ignatchenko et al.
U.S. Appl. No. 15/273,910, filed Sep. 23, 2016, Ignatchenko et al.
Anderson, "Security Engineering: A Guide to Building Dependable Distributed Systems," Protocols, Chapter 2, pp. 13-33 (2008) <www.cl.cam.ac.uk/~rja14/Papers/SE-02.pdf>, in U.S. Appl. No. 14/274,219.
Bahr et al., "Minimizing Trilateration Errors in the Presence of Uncertain Landmark Positions," *EMCR*, pp. 1-6 (2007), in U.S. Appl. No. 14/274,219.
Brands et al., "Distance-Bounding Protocols," Pro. Advances in Cryptology (EUROCRYPT/'93), pp. 344-359 (1994) <http://citeseerx.ist.psu.edu/viewdoc/download?doi=10.1.1.51.6437&rep=rep1&type=pdf>, in U.S. Appl. No. 14/274,219.
Capkun et al., "Secure positioning of wireless devices with application to sensor networks," INFOCOM 2005, $24^{th}$ Annual Joint Conference of the IEEE Computer and Communications Societies, Proceedings IEEE, 3:1917-1928 (2005), in U.S. Appl. No. 14/274,219.
Clulow et al., "So Near and Yet So Far: Distance-Bounding Attacks in Wireless Networks," ESAS' 2006 Proceedings of the Third European Conference on Security and Privacy in Ad-Hoc and Sensor Networks, pp. 83-97 (2006), in U.S. Appl. No. 14/274,219.
Cremers et al., "Distance Hijacking Attacks on Distance Bounding Protocols," ETH Zurich, Institute of Information Security, Switzerland, pp. 1-35 (2012) <http://eprint.iacr.org/2011/129.pdf>, in U.S. Appl. No. 14/274,219.
Francis et al., "Practical Relay Attack on Contactles Transactions by Using NFC Mobile Phones," The 2012 Workshop on RFID and IoT Security (RFIDsec2012 Asia), Editors / Nai-Wei Lo; Yingjiu Li., IOS Press, 8:21-32 (2012), in U.S. Appl. No. 14/274,219.
Hancke et al.,"Attacks on Time-of-Flight Distance Bounding Channels," Proceedings of $1^{st}$ ACM Conference on Wireless Network Security, pp. 194-202 (2008), in U.S. Appl. No. 14/274,219.
Hancke et al., "Security of Proximity Identification Systems," Technical Report in No. 752, University of Cambridge Computer Laboratory, pp. 1-161 (2009).
"Information technology—Identification cards—Integrated circuit(s) cards with contacts—Part 3: Electronic signals and transmission protocols," ISO/IEC 7816—3:1997/PDAM-2, ISO/IEC, 16 pgs. (2002), in U.S. Appl. No. 14/274,219.
International Search Report and Written Opinion dated Aug. 7, 2014, as received in International Application No. PCT/IB2014/059542, in U.S. Appl. No. 14/274,219.
International Search Report and Written Opinion dated Aug. 7, 2014, as received in International Application No. PCT/IB2014/061347, in U.S. Appl. No. 14/274,219.
International Search Report and Written Opinion dated Jan. 8, 2015, as received in International Application No. PCT/IB2014/064606, in U.S. Appl. No. 14/274,219.
International Search Report and Written Opinion dated Jul. 7, 2014, as received in International Application No. PCT/IB2014/059537, in U.S. Appl. No. 14/274,219.
Jung, "SSL/TLS," CS 686 Special Topics in Computer Science: Privacy and Security, Department of Computer Science, University of San Francisco, pp. 1-18 (2010) <http://www.cs.usfca.edu/~ejung/courses/686/lectures/10SSL.pdf>, in U.S. Appl. No. 14/274,219.
Man-in-the-middle attack, n.d., Web, Oct. 27, 2015, Wiki: <http://en.wikipedia.org/wiki/Mafia_Fraud_Attack>, in U.S. Appl. No. 14/274,219.
Meadows et al., "Distance bounding protocols: authentication logic analysis and collusion attacks,"—in Secure Localization and Time

(56) References Cited

OTHER PUBLICATIONS synchronization for wireless sensor and ad hoc Networks; *Advances in Information Security*, 30:279-298 (2007), in U.S. Appl. No. 14/274,219.
Singelee et al., "Location Verification using Secure Distance Bounding Protocols," Proc. IEEE International Conference Mobile Ad hoc and Sensor Systems, pp. 840-846 (2005), in U.S. Appl. No. 14/274,219.
Thorbjornsen et al., "Radio Frequency (RF) Time-of-Flight Ranging for Wireless Sensor Networks," *Meas. Sci. Technol.*, 21(3):1-22 (2010) <http://eprints.soton.ac.uk/268352/1/rf_time-of-flight_ranging.pdf>, in U.S. Appl. No. 14/274,219.
Yang et al., "Quality of Trilateration: Confidence based Iterative Localization," *IEEE Transactions on Parallel and Distributed Systems*, 21(5):631-640 (2010), in U.S. Appl. No. 14/274,219.

SYSTEMS, METHODS AND APPARATUSES FOR ENSURING PROXIMITY OF WIFI COMMUNICATION DEVICES

RELATED APPLICATIONS

This application is a continuation of U.S. application Ser. No. 14/274,219, filed May 9, 2014, which claims priority to U.S. Provisional Application No. 61/821,962, filed May 10, 2013, both entitled "SYSTEMS, METHODS AND APPARATUSES FOR ENSURING PROXIMITY OF WIFI COMMUNICATION DEVICES," the contents of all of which are incorporated herein by reference in their entirety.

FIELD OF THE DISCLOSURE

The systems, methods and apparatuses described herein relate to data communication between electronic devices, and in particular, ensuring that communication devices are within a predetermined proximity of one another.

BACKGROUND

There is a need in the art to determine whether two devices that are communicating with one another are within a predetermined proximity of each other. This need may be based on a desire to ensure that two devices remain physically proximate, or based on a desire to enhance security by reducing the possibility of certain types of malicious attacks. With respect to the former, for example, one may want to ensure that an electronic monitoring device worn by a person on bail, or an electronic tracking device located on an automobile, remains within a predefined or predetermined distance of a monitoring station or monitoring terminal.

With respect to the latter scenario, while physical proximity of devices communicating with one another may enhance the security of the communication there is a need to ensure that the devices are actually proximate. For example, wireless communication technologies (such as, for example, Near-Field Communication (NFC), or WiFi) may be used in the process of establishing a secure communication channel between two devices. As one example, two devices with the wireless communication capabilities may be brought close to each other to exchange encryption keys for establishing a secure sockets layer (SSL) session. Due to the physical constraints of such wireless communication methods, it is believed that the key exchange can only happen between devices that are physically located close to each other. However, various attacks still may pose serious security threats. For example, a relay attack (a variation of the man-in-the-middle attack) may be performed by using a fake terminal or hot spot equipped with signal re-transmitters to re-transmit the communication signal while the legitimate communication partner may be located far away.

Therefore, there is a need in the art for ensuring a communication partner at the other end of a communication link is within a predefined physical proximity.

DETAILED DESCRIPTION

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

Figure 1:
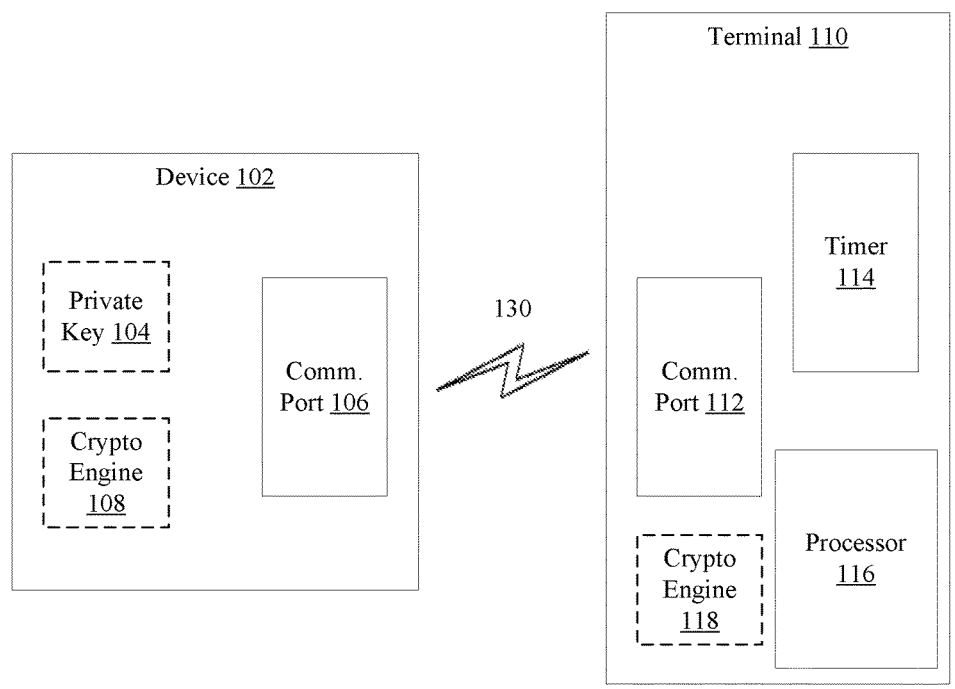
FIG. 1 is a block diagram of an exemplary system according to the present disclosure.

Without being limiting, FIG. 1 shows an exemplary system 100 according to the present disclosure. The system 100 may comprise a device 102 and a terminal 110. The device 102 may comprise a communication port 106, and optionally a private key 104 and a crypto engine 108. The optional private key 104 may be stored in a non-volatile storage (not shown) of the device 102. The terminal 110 may comprise a communication port 112, a timer (or counter) 114, a processor 116, and optionally a crypto engine 118. Although the timer (or counter) 114 is shown as a separate component, in certain embodiments, the timer 114 may be implemented as part of the processor 116 (e.g., in software or hardware), or may be integrated into other components of the terminal 110. In embodiments where the crypto engines 108 and 118 are present, they may be implemented in hardware, software, or combination of hardware and software.

The communications ports 106 and 112 may communicate with each other by establishing a communication link 130. The link 130 may be a wireless communication link, a wired communication link or a combination of both. As a non-limiting example, the communications ports 106 and 112 may be compatible ultra-short range (e.g., NFC or capacitance-based transceivers), short range (e.g., WiFi or Bluetooth transceivers), or long range (e.g., radio transceivers) communication ports that may be used to establish a wireless communication link 130 when the communication ports 106 and 112 are physically within a distance sufficient to establish a communication link. Those with skill in the art recognize that this distance may vary depending on the specific communication link utilized (e.g., NFC, Bluetooth, WiFi, radio, etc.). As another non-limiting example, the communication ports 106 and 112 may be communication interfaces for wired links, such as, USB connectors, IEEE 1394, RJ-45, etc., and the link 130 may be a wired link between the device 102 and the terminal 110.

It is to be understood that the systems, methods and apparatuses of the present invention are broad enough to be applicable to any two electronic devices capable of communicating with one another (either directly or indirectly), and that they are not limited to any specific communication technology or implementation. For purposes of illustration only, the device 102 may be a mobile device (such as a mobile phone) or a key-card, and the terminal 110 may be a key card reader terminal. As another example, the device 102 may be a tracking device located on a car or carried by a person on bail, and the terminal 110 may be a monitoring station. It is also to be understood that the terminal 110 need not be a stationary device and that it, too, may be implemented in a mobile or portable form factor.

It is to be understood that ensuring or verifying that two devices are within a predetermined proximity and reducing or eliminating the risk of relay attacks may be complimentary applications of the systems, methods and apparatuses of the present disclosure. For example, the present disclosure may be applicable to ensure not only that a monitored vehicle is within a predetermined proximity of a monitoring station, but that malicious or unauthorized relay techniques are not used to mislead the monitoring station into believing that the monitored vehicle is within the predefined proximity when in fact it is not.

Figure 2A:
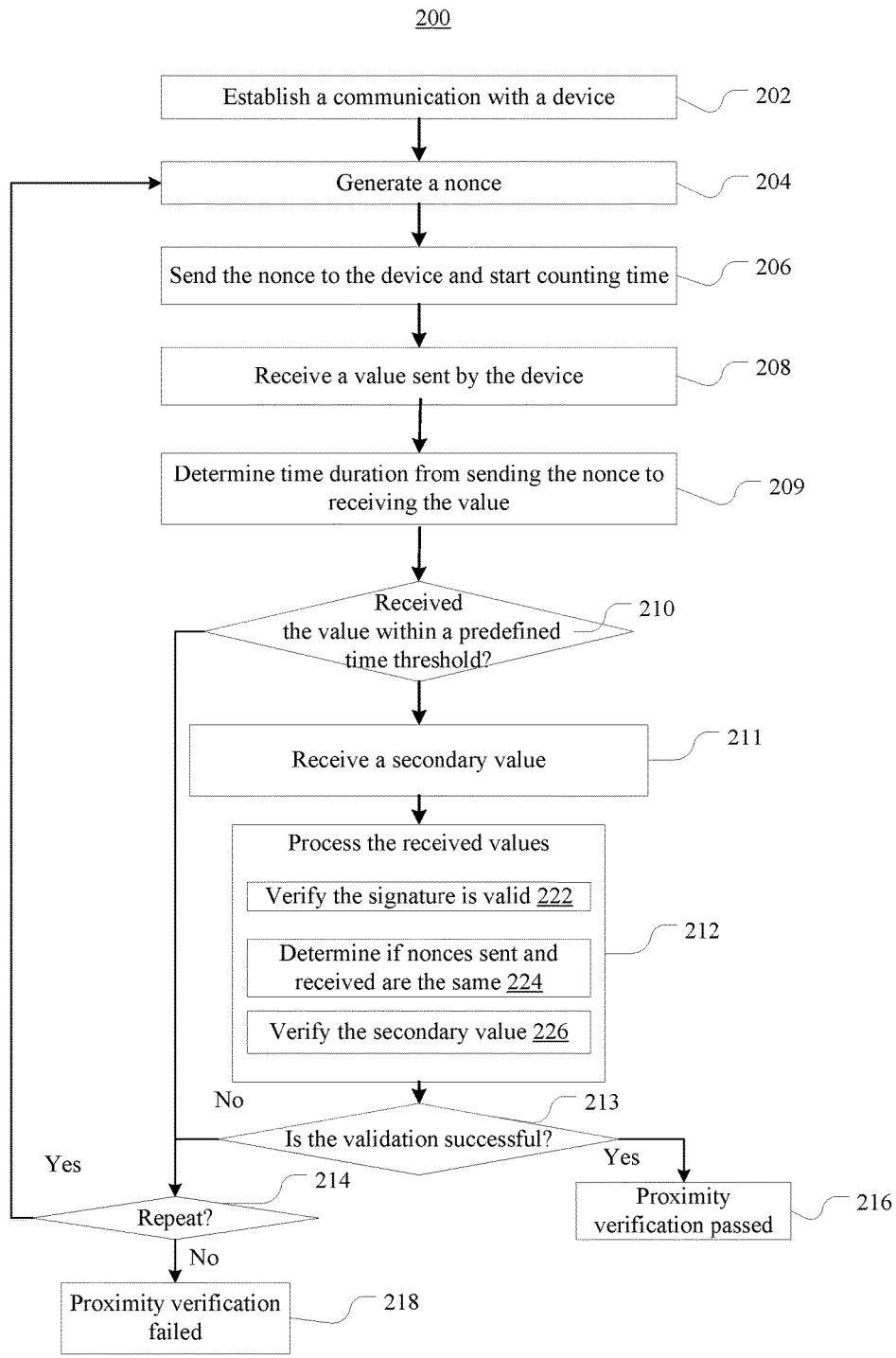
FIG. 2A is a flow diagram illustrating an exemplary method for verifying a communication partner according to the present disclosure.

FIG. 2A illustrates an exemplary method 200 that may be implemented by the terminal 110 to verify the proximity of the device 102 (e.g., to determine whether a device 102 is within or outside a predetermined or predefined physical proximity of the terminal 110). The method 200 may start at block 202, at which the terminal 110 may establish a communication link 130 with the device 102 to communicate data between the device and the terminal. The details of establishing such a data connection may depend on the particular type of wireless or wired (or combination of both) communication link 130 used in a particular implementation. In addition, an optional logical channel (such as TCP connection, X.25 connection, Sequenced Packet Exchange (SPX) connection, High-Level Data Link Control (HDLC) connection, SSL/TLS connection over any of these connections, or similar connection; in some embodiments, logical channel may consist of multiple TCP connections, X.25 connections, Sequenced Packet Exchange (SPX) connections, High-Level Data Link Control (HDLC) connections, SSL/TLS connections, other similar connections, or combinations of them) may be established over the communication link 130.

At block 204, a nonce may be generated. For example, a cryptographically safe random number generator (implemented in hardware (not shown) or implemented in software running on the processor 116) may be used for this purpose. At block 206, the generated nonce may be sent to the device 102 and the timer 114 may be started to count time from when the nonce is sent.

Figure 2B:
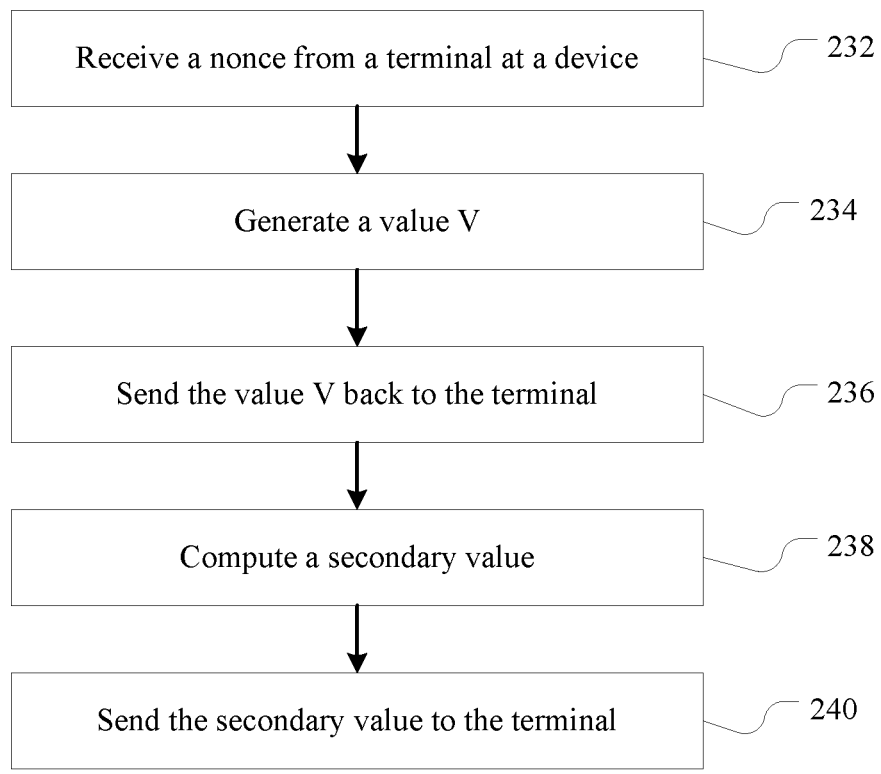
FIG. 2B is a flow diagram illustrating another exemplary method for verifying a communication partner according to the present disclosure.

The device 102 may implement an exemplary method 230 shown in FIG. 2B corresponding to the exemplary method 200. At block 232, the device 102 may receive the nonce. At block 234, the device 102 may generate a value V. In one embodiment, the value V (which may also be referred to as the parameter V) may be generated using a random number generator (not shown) and may be a random number that cannot be predicted and/or computed outside the device 102. In some embodiments, to speed up the processing within block 234, the value V may be pre-generated (as long as it is not previously disclosed outside the device 102). At block 236, the value V (also referred to as a verification value) may be sent to the terminal 110.

Referring back to the exemplary method 200 on FIG. 2A, at block 208, the terminal 110 may receive the verification value from the device 102, and at block 209 may determine the time τ elapsed from sending the nonce until receiving the verification value. At block 210, the time τ may be compared to a predefined time threshold $T_{th}$. If the verification value is not received within the predefined time threshold $T_{th}$, then, from block 210, the method 200 may proceed to block 218 (or, optionally, to block 214).

The exemplary method 230 of FIG. 2B, in the meantime, may proceed from block 236 to block 238, at which, the device 102 may compute a secondary value. The secondary value may be generated from the value of the nonce received at block 232, the value V and may optionally include a measured time value $t_x$. For example, the secondary value may be a concatenation of the nonce, the value V and the optional time value $t_x$. In some embodiments, the secondary value may additionally include some other information, such as, for example, current date and time. As will be described in details below, the measured time value $t_x$ may be a time period from when the device 102 receives a last symbol of the communication from the terminal 110 that transmits the nonce to when the device 102 starts sending a first reply symbol. In some embodiments, authenticating data for the secondary value may be generated. For example, the secondary value may be signed and/or encrypted with a private key of the device 102. The signing or encryption at the device 102 may be performed, for example, by the optional crypto engine 108 or by the processor 116. At block 240, the device 102 may send the secondary value to the terminal 110. If the secondary value is signed or encrypted by the device 102, the secondary value may be sent with the authenticating data, for example, the signature or in its encrypted form.

It should be noted that while operations within block 238 may take a significant amount of time (for example, on the order of 0.01 to 0.1 second), it does not affect $T_{th}$, which may be limited only by the speed of block 234 (which, in some embodiments may be in the sub-nanosecond range when a pre-generated value V is used).

Referring back to the exemplary method 200 in FIG. 2A, if at block 210, it is determined that the verification value is received within the predefined time threshold $T_{th}$, the method 200 may proceed to block 211, at which the terminal 110 may receive the secondary value. Then, at block 212, the terminal 110 may process the verification value and the secondary value by performing the exemplary processes shown in blocks 222, 224 and 226. For example, at block 222, using a public key of the device 102 (e.g., the public key corresponding the optional private key 104), the terminal 110 may authenticate the secondary value using the authenticating data, such as, verifying the signature of (or decrypting) the received secondary value. At block 224, the value of the nonce sent to the device 102 may be compared to the value of the nonce received as part of the secondary value from the device 102. At block 226, the terminal 110 may verify the secondary value, for example, by comparing the value V received at block 408 to the value V received as a part of the secondary value received at block 211.

If all the checks in blocks 222-226 are successful, at block 213 the validation may be determined to be successful and the method 200 may proceed to block 216, at which the method 200 may determine that the proximity verification has passed. If either the time check at block 210 or the validation determination at block 213 fails (for example, because of failing of any one of the checks at blocks 222-226), the method 200 may proceed to block 218 (or optionally block 214), at which the method 200 may determine that the proximity verification has failed.

Passing the proximity verification at block 216 may be interpreted as "the owner of the private key that corresponds to the public key used in block 211 is on the other end of the communication link established in block 202, and within the proximity determined by the time threshold $T_{th}$". In some embodiments, if the communication between the two communicating partners is through a protected channel (such as SSL/TLS connection(s) over the communication link), the method 200 may provide strong proximity and authentication assurances.

Those with skill in the art understand that the method 200 may be initiated by the device 102 to ensure that the terminal 110 is in close proximity, too. In certain embodiments, the same methods 200 and 230 may be performed by both sides of a communication link for mutual proximity verification.

It should be noted that other processes of establishing proximity may be used in place of methods 200 and 230. For example, exemplary processes for establishing proximity may include those described in U.S. Provisional Patent Application 61/792,996, filed Mar. 15, 2013, entitled "Systems, Methods and Apparatuses for Ensuring Proximity of Communication Device," the content of which is incorporated herein by reference in its entirety.

It should further be noted that, when signature of the secondary value is used, the signature may be implemented by encryption a hash of the secondary value, or by encrypting the whole or a part of the secondary value by the private key of the device 102. If the whole or a part of the secondary value is encrypted, the signature verification may be implemented as decryption using a public key that corresponds to the private key of the device 102.

Figure 3A:
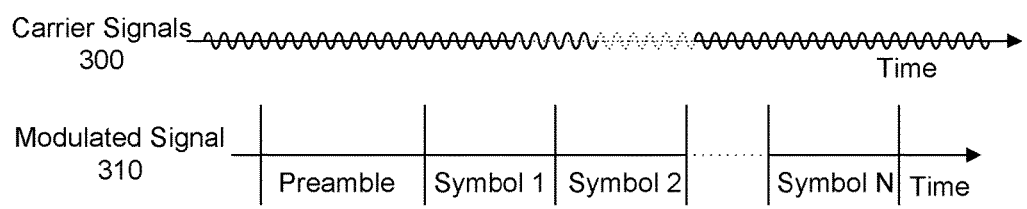
FIG. 3A is a time sequence diagram illustrating communication signals according to the present disclosure.

FIG. 3A is a time sequence diagram illustrating communication signals according to the present disclosure. A modulated signal 310 may start with a preamble, which may be used to allow a receiver to synchronize with a transmitter. In an exemplary embodiment using WiFi communication according to the IEEE 802.11n standard, the preamble may take 16 µs. A modulated signal 310 may comprise a plurality of symbols (e.g., symbol 1, symbol 2, symbol 3 or more that are not shown). Depending on modulation techniques, a symbol in the modulated signal 310 may represent different number of bits of information. For example, each symbol may represent three bits for 8 Quadrature Amplitude Modulation (8QAM), six bits for 64QAM, 2 bits for Quadrature Phase Shift Keying (QPSK) Modulation, and one bit for Binary Phase Shift Keying (BPSK) Modulation. In some embodiments, non-integer number of bits per symbol may also be possible. If a multi-carrier modulation method is used, each symbol may be on the order of hundreds of bits. An exemplary multi-carrier modulation technique is orthogonal frequency-division multiplexing (OFDM)). If, for example, 48-subchannel OFDM with 64QAM within each channel is used, each OFDM symbol may contain up to 288 bits.

In one exemplary embodiment with WiFi communications according to the IEEE 802.11n standard, each OFDM symbol (including "guard interval") may be 4 µs long, while the carrier signal frequency may be, for example, 5 GHz (which is equivalent to the carrier period being 0.2 ns). That is, for every symbol transmitted, there may be 20000 cycles of the carrier signal. In case of single-carrier modulation (such as QAM modulation), the typical number of cycles per symbol may be significantly lower, for example, on the order of a few hundred carrier cycles per symbol.

Figure 3B:
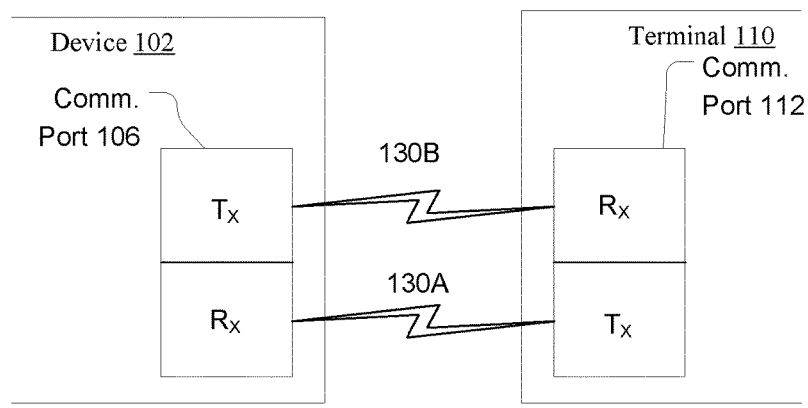
FIG. 3B is a block diagram illustrating two partners engaging in communication according to the present disclosure.

FIG. 3B is a block diagram illustrating two partners engaging in communication according to the present disclosure. In the example shown in FIG. 3B, the communication link 130 may be implemented as a full-duplex link, i.e., as two logically separate links (130A and 130B) performing transmission in different directions simultaneously. In some embodiments, the full-duplex link may be implemented by two separate antennas on the device 102 and two separate antennas on the terminal 110, with each of the links 130A and 130B working on different frequencies. For example, the transmitters $T_X$ and receivers $R_X$ of both of the device 102 and the terminal 110 may have separate antennas. In some other embodiments, the full-duplex link may be implemented on the same frequency using multiple-input and multiple-output (MIMO) antennas, for example, as described in the book Digital Communication, by Edward A. Lee and David G. Messerschmit (1988) at pages 461-474 (which is incorporated herein by reference). Yet in some other embodiments, a single antenna may be used on either the device 102 or the terminal 110 to achieve the full-duplex link, for example, as described in Michael Knox, "Single antenna bidirectional radio communications," Texas Wireless Summit 2011, Oct. 25, 2011 (which is incorporated herein by reference). In many cases, antennas used for such communications (and/or some other related elements, like oscillators, mixers, modulators/demodulators, etc.) may be the same antennas (and/or other related elements) that are normally used for WiFi communications.

Figure 3C:
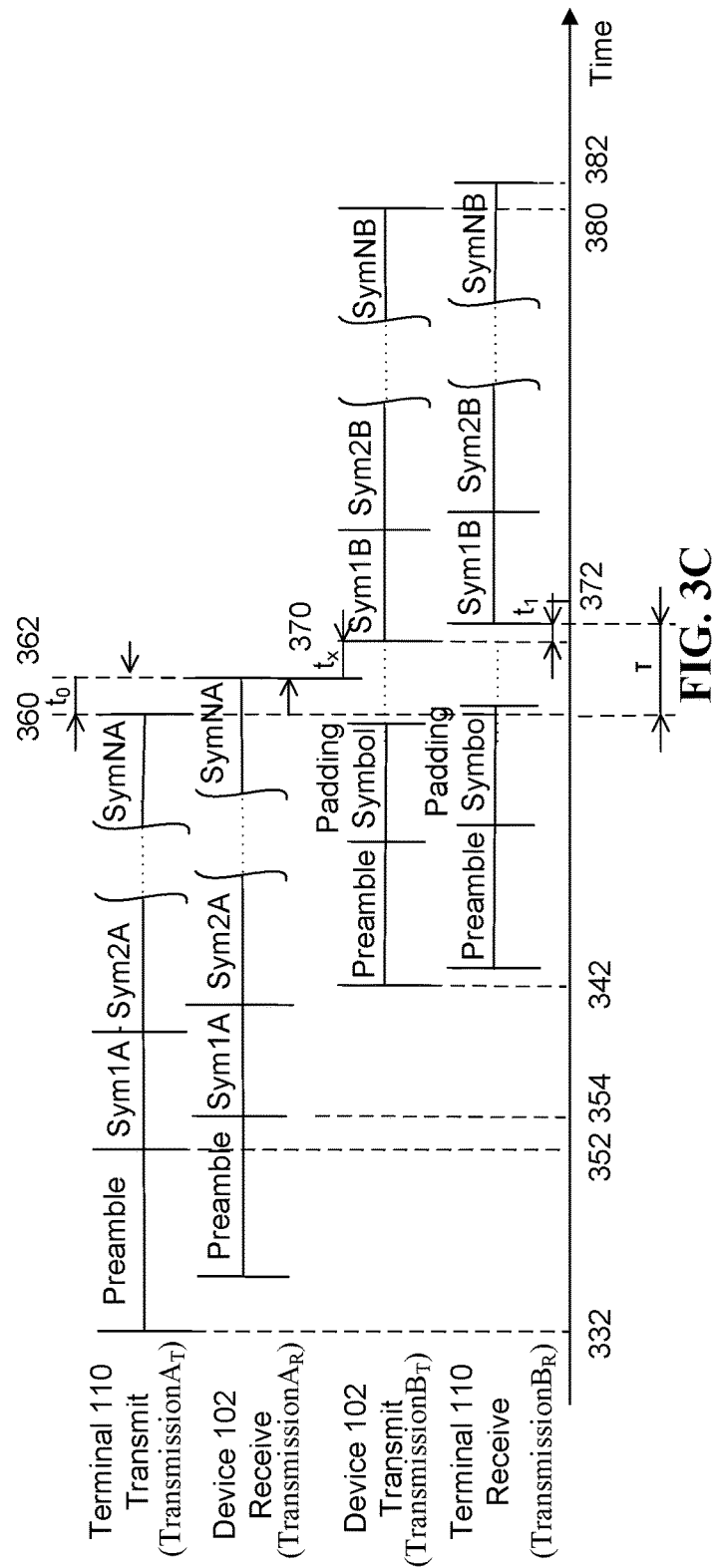
FIG. 3C is a time sequence diagram illustrating communication signals being transmitted and received by two partners engaging in communication according to the present disclosure.

FIG. 3C is a time sequence diagram illustrating communication signals for a request and a response being transmitted and received by two partners engaging in an exemplary communication according to the present disclosure. Each point in time may be referred to as a moment in the following description. Note that while it is described in terms of separate transmitting and receiving antennas, the same description is applicable to a full-duplex link implemented using the same antenna for both transmitting and receiving. As shown on FIG. 3C, at the moment 332, a transmitting antenna of the terminal 110 may start transmission of a preamble for a request (e.g., the nonce); and at the moment 352, it may start the transmission of the 1st symbol of the nonce (sym1A) over the link 130A. At the moment 354, a receiving antenna of the device 102 may start receiving the symbol sym1A over the link 130A. The moment 354 may be slightly after the moment 352 due to the time it takes for radio waves to reach the device 102. Then at the moment 360, the transmitting antenna of terminal 110 may end the transmission of the last symbol of the nonce (symNA) over the link 130A. It should be noted that in some embodiments, the nonce may be represented by a single symbol, so in this case N is one and only sym1A is transmitted. At the moment 362, the receiving antenna of the device 102 may end receiving the symbol symNA. The time difference between the moment 362 and moment 360 may be referred to as $t_0$.

Meanwhile, the transmitting antenna of device 102 may start transmitting its own preamble. This moment is shown as the moment 342 on FIG. 3C. It should be noted that in some embodiments the moment 342 may occur before the moments 352-354, and even before the moment 332. After the preamble is transferred, the transmitting antenna of device 102 may start transmitting "padding symbols" which are not related to the nonce. These padding symbols may include, for example, repeated same pre-defined symbol, or some data to be transmitted from the device 102 to terminal 110. It should be noted that padding symbols are optional.

In some embodiments, when the device 102 is receiving symbols sym1A through symNA, it may collect timing information about the symbols and/or the carrier signal, so it may calculate with a high precision the exact moment 362 when it will end receiving the symbol symNA. After the predicted moment 362 occurs, the device 102 may start transmitting the 1st symbol sym1B of the response (e.g., the value V) over the link 130B. Note that if there is a delay $d_t$ (such as a filter delay, etc.) between the moment when the transmission is logically started over the link 130B, and the moment when the actual transmission by a transmitting antenna of the device 102 is started, in some embodiments, such delays may be accounted for by logically starting transmission $d_t$ earlier (which is possible in embodiments where the value V does not depend on the nonce). In some other embodiments, such delays may be accounted for by adding $d_t$ to $t_x$, which is described below. Solutions that combine the different approaches are also possible.

At time moment 370, a transmitting antenna of the device 102 may start the transmission of the first reply symbol sym1B. The difference between the moment 362 and moment 370 may be referred to as $t_x$. The time period $t_x$ may consist of two parts: a fixed part and a variable part. The fixed part may include known delays within the device 102, such as delays of hardware components. In some embodiments, this fixed part of $t_x$ may be negative, which in some cases may lead to $t_x$ being negative, i.e. the moment 370 occurring before the moment 362. The variable part may consist of measurement errors and implementation inaccuracies within the device 102. In addition, if the modulated signal of the transmitting signal in link 130B is not synchronized with modulated signal in link 130A, the variable part of $t_x$ may include up to the length of a padding symbol.

At the moment 372, a receiving antenna of the terminal 110 may start receiving the first reply symbol sym1B over the link 130B. The time difference between the moment 370 and moment 372 may be referred to as $t_1$.

The terminal 110 may measure the interval $\tau$ between the moment 360 and moment 372. For example, in some embodiments the terminal 110 may need to take into account internal delays, similar to handling of $d_t$ as described above for the device 102. As seen from FIG. 3C, $\tau = t_0 + t_x + t_1$. Here $(t_0 + t_1) \cdot c = 2 \cdot D$, wherein c is the speed of propagation of radio signal in air (which is well-known, and is approximately $2,989 \cdot 10^8$ m/s, a little bit less than the speed of light in a vacuum), and D is the distance (measured along the path that the radio signal have traversed) between the device 102 and terminal 110. This may allow (after taking into account the known fixed part of $t_x$) the terminal 110 to calculate D based on measured $\tau$. Alternatively, the time threshold value $T_{th}$ for the purpose of the process described with respect to FIGS. 2A and 2B may be pre-calculated based on the known c, $t_x$, and maximum allowed D. It should be noted that in some embodiments, the fixed part of $t_x$ may be minimized (as long as such minimization doesn't greatly affect the precision in measuring the moment 360) to reduce the likelihood of success for certain attacks.

In one embodiment, for example, when 4 µs OFDM symbols are used, the possible inaccuracy of $t_0 + t_1$ determined according to the description above (without synchronization between carriers in link 130A and link 130B), may be roughly estimated on the order of 4-5 µs (inaccuracy of 4 µs may be caused by delay of up to 1 OFDM symbol, the rest may be caused by possible inaccuracies in the device 102 and terminal 110). That is, the inaccuracy of the determined $t_0 + t_1$ may be on the order of 4-5 µs, which may translate into an inaccuracy of the determined distance D on the order of a few kilometers.

To improve accuracy of determined distance D, in some embodiments, synchronization between data streams in the link 130A and link 130B may be used. Such synchronization may be achieved, for example, by the device 102 choosing the moment 342 after it has received a full preamble from the terminal 110 over the link 130A, or choosing the moment 342 (or a moment of transmission of the 1st padding symbol) in a certain pre-defined relation to the stream received from the terminal 110. In this case, inaccuracy of the determined $t_0 + t_1$ may be roughly estimated as a sum of (a) inaccuracy of the determined moment 362 by the device 102, (b) inaccuracy of the determined moment 372 by the terminal 110, (c) inaccuracy of measurement of the time between the moment of synchronization between the streams ($t_{sync}$, not shown) and the moment 370, (d) inaccuracy of measurement of $\tau$, and (e) other inaccuracies. In some embodiments, (a) and (b) may be of the same order of magnitude, and can be roughly estimated as symbol_time$\cdot 10^{-4}$, (c) and (d) may be roughly estimated as $(t_{370} - t_{sync}) \cdot 10^{-5}$ and $\tau \cdot 10^{-5}$ respectively, and (e) can be roughly estimated on the order of a few carrier cycles. For example, for 4 µs OFDM symbols, $\tau$ may be on the order of 100 ns, and for synchronization between streams that has occurred 20 µs before the moment 370, it may translate into inaccuracies on the order of $2 \cdot 4$ µs$\cdot 10^{-4}$+(20 µs+100 ns)$\cdot 10^{-5}$+(0.2~0.6) ns=1.2~1.6 ns, which may translate into an inaccuracy of the determined distance D on the order of 10~15 centimeters. (The character ~ is intended to denote a range, e.g., "1.2~1.6" should be read to mean "1.2 to 1.6.") Such an accuracy level may allow embodiments using such technology in, for example, entry control devices or payment systems. It should be noted that all accuracy and inaccuracy estimates, which are provided in the present disclosure, are merely exemplary and should not be understood as limiting the scope of the present disclosure.

In some other embodiments, another method of improving accuracy of distance D may be used. In such embodiments, the device 102 may measure the time $t_x$ between the moment 362 and moment 370, and add the time $t_x$ as another field to the secondary value. Therefore, in such embodiments, the secondary value may comprise three fields: the nonce received at block 232, the value V, and the time $t_x$. In some embodiments, another similar time interval, which differs from the time $t_x$ by a constant may be used instead. The constant may be, for example, well-known, or, in another example, may be well-known for each of types of device 102. Then the terminal 110, after receiving (and optionally decrypting) the secondary value, may obtain the time $t_x$ and use it to calculate D. In this case $(t_0 + t_1)$ may be calculated as $(\tau-t_x)$. Moreover, if the time interval included into the secondary value differs from $t_x$ by a constant, this constant may need to be subtracted here as well. In such embodiments, inaccuracies may be roughly estimated as (a) inaccuracy of determining the moment 362 by the device 102, (b) inaccuracy of determining the moment 372 by the terminal 110, (c) inaccuracy of measurement of $t_x$, (d) inaccuracy of measurement of $\tau$, and (e) other inaccuracies. In some embodiments, (a) and (b) may be roughly estimated as described above, (c) and (d) may be roughly estimated as $t_x*10^{-5}$ and $\tau*10^{-5}$ respectively, and (e) may be roughly estimated on the order of a few carrier cycles. For example, if the OFDM symbols are used, with $t_x$ and $\tau$ estimated on the order of 4 μs (one OFDM symbol), the inaccuracy may be on the order of $2*4$ μs$*10^{-4}+2*4$ μs$*10^{-5}+(0.2\sim0.6)$ ns=1.1~1.5 ns, which may translate into an inaccuracy of the determined distance D on the order of 10~15 centimeters.

In some of the embodiments where $t_x$ is included into the secondary value, the terminal 110 may need to validate (for example, at block 212) that the $t_x$ received as a part of the secondary value is within a pre-defined limit. For example, the typical $t_x$ may be expected to be on the order of 20 μs in a WiFi connection. Then, if the $t_x$ in a received secondary value is much larger than expected, for example, in the millisecond range, it may indicate that device 102 may be compromised and/or that some kind of attack is under way.

In some embodiments, the moment 342 (when the device 102 starts transmitting a preamble) may occur after the moment 362 (when the device 102 receives the symbol symNA). In some cases, the same communication channel may be used for all the communications shown on FIG. 3C. For example, the communication between the terminal 110 and device 102 may be implemented as half-duplex communication or may use a channel shared by more than 2 stations. In some embodiments, both transmissions (from the terminal 110 to the device 102 and from the device 102 to the terminal 110) may represent WiFi frames, separated by one of WiFi inter-frame times, for example, Short Interframe Space (SIFS) time. If half-duplex or a shared channel is used, it may lead to increase of time $t_x$ (compared to $t_x$ when full-duplex is used). For example, if WiFi channel is used, the value of $t_x$ may be on the order of 20 μs (for example, in some embodiments it may be 2 μs SIFS time plus 16 μs preamble). This increased $t_x$ may be handled as described above, for example, via increasing fixed portion of $t_x$, or via measuring interval $t_x$ (or some other similar interval) and including the measured $t_x$ into the secondary value. This increased value of $t_x$ may lead to slightly increased inaccuracies. According to the calculations provided above, such additional inaccuracies may be on the order of 20 μs$*10^{-5}$, or 0.2 ns, which may translate into an additional inaccuracy of the determined distance D on the order of a 1~2 centimeters.

In some of the embodiments described in the present disclosure, the moment at which the beginning or end of the symbol is received may need to be determined with precision. In some embodiments, for example, if OFDM is used, high precision may be achieved, for example, by using position of fast Fourier transform (FFT) window. Any known FFT window position recovery techniques or those that may be developed in the future may be used, such as, for example, the techniques described in EPO patent application EP 2071787A1, U.S. Pat. No. 6,058,121, or U.S. Pat. No. 6,853,616, the content of each of which is incorporated herein by reference. In other embodiments, other (both existing and future) methods of determination of the moment of the beginning/end of the symbol being received, may be used. In an another example, if direct QAM modulation is used rather than OFDM modulation, then in such embodiments, to determine beginning/end of the QAM symbol, timing recovery techniques may be used, such as, for example, QAM timing recovery module described in "Digital Communication," by Edward A. Lee and David G. Messerschmit (1988), the content of which is incorporated by reference in its entirety.

In some embodiments, to improve precision of time of receiving/adding symbol, multiple measurements may be performed. For example, in some embodiments more than one TransmissionA (each TransmissionA consisting of preamble and symbols transmitted from terminal 110 to device 102) and/or more than one TransmissionB (each TransmissionB consisting of preamble and symbols transmitted from device 102 to terminal 110) may be performed for the purposes of proximity verification, averaging time measurement results over transmissions in the same direction; in such cases each of transmissions may include a different nonce.

In some embodiments, proximity verification described above, may be performed over a WiFi channel (for example, over IEEE 802.11n 20 MHz channel, which normally uses OFDM symbols). In this case, in one non-limiting example, TransmissionA and/or TransmissionB may be implemented as specially introduced WiFi management frames, with these frames normally modulated according to 802.11n modulation rules as OFDM symbols, and separated, for example, with SIFS time as described above. In another non-limiting example, TransmissionA and/or TransmissionB may be implemented as special non-OFDM transmissions (for example, as QAM transmissions or BPSK/QPSK transmissions) within the same WiFi channel. In this case each transmission within the WiFi channel may be either OFDM transmission (for example, for usual WiFi communications) or non-OFDM transmission (for example, for proximity verification purposes).

The embodiments illustrated by FIGS. 1-3 may be used in proximity verification in point-to-point scenarios. However, before carrying out such proximity verification, in some embodiments it may be desirable for a terminal 110 to find out likely candidates for such proximity verification. For example, if the physical properties of a wireless communication are such that it may possibly reach devices within 100 meters (which is a typical radius for WiFi communication), there may be dozens of different devices within the physical range of the wireless connection. If the communication should be activated only if a device is within 20 cm of the terminal 110, then verifying distances with all such devices within the physical range may in some cases be impractical or too energy-consuming.

Figure 4A:
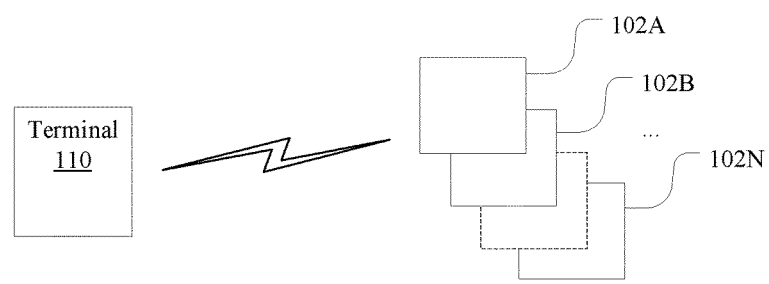
FIG. 4A is a block diagram illustrating a system according to the present disclosure.
Figure 4B:
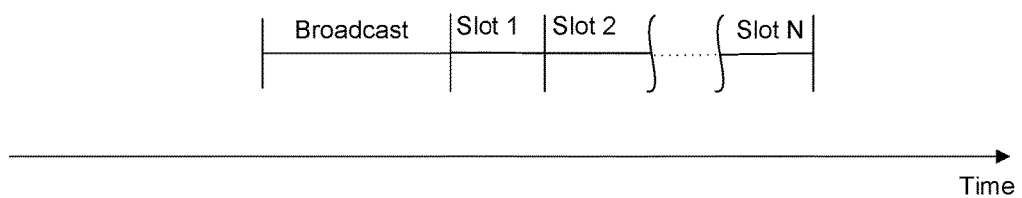
FIG. 4B is a time sequence diagram illustrating communication signals being transmitted and received according to the present disclosure.
Figure 5:
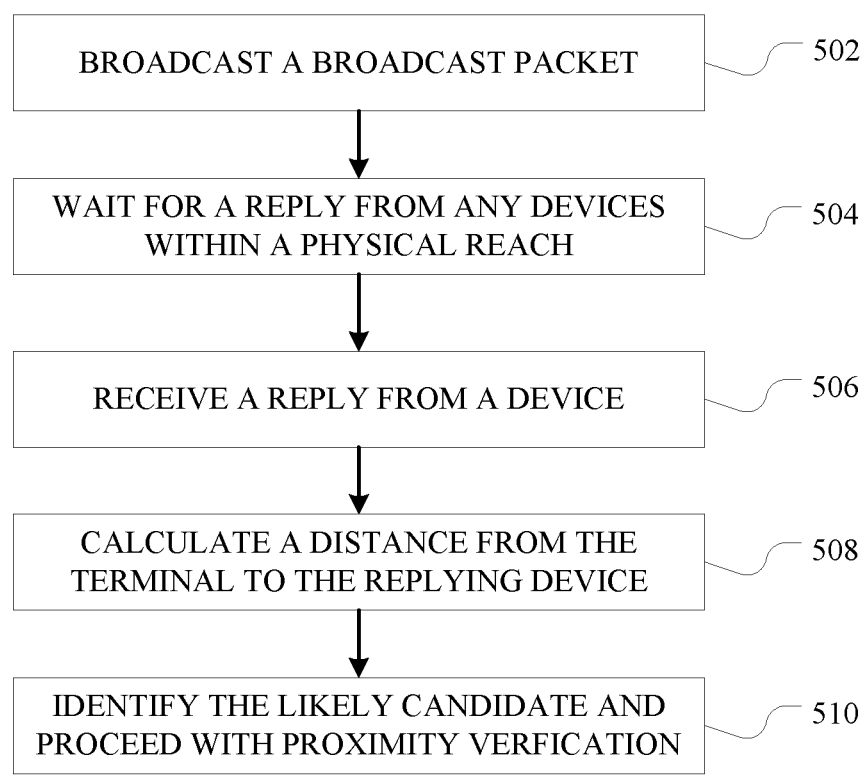
FIG. 5 is a flow diagram illustrating an exemplary method for a communication partner to be selected according to the present disclosure.

FIG. 4A is a block diagram illustrating a system according to the present disclosure. As shown in FIG. 4A, a plurality of devices, 102A to 102N may be within a physical range of the terminal 110. FIG. 4B is a time sequence diagram illustrating symbol timings for an exemplary method that may allow the terminal 110 to select likely candidate device(s) 102. FIG. 5 is a flow diagram illustrating an exemplary method 500 for a likely candidate device 102 to be selected for further proximity verification according to the present disclosure. In some embodiments, after the likely candidate is selected, a more rigorous process (such as the process described with respect to FIGS. 2A and 2B) may be performed to perform the proximity verification.

The method 500 may start at block 502, at which a broadcast packet may be broadcasted. In some embodiments, for example, the broadcast packet may be broadcasted periodically (for example, once per 0.1 sec or once per 1 sec). Also, the broadcast packet may be a special broadcast packet transmitted within a predefined frequency channel, which, for ease of reference, may be referred to as channel A. The broadcast packet may include information such as, for example, the terminal type, terminal identifier (id), etc., as well as information about the structure of time slots (such as a time slot size and number of available time slots). In some embodiments, to allow different terminals to work within a close range, collision detection may be used by terminals (for example, with one randomly timed interval after such collision has been detected; other collision detection/prevention methods are also possible).

In some embodiments, a WiFi channel (for example, a 20 Mhz IEEE 802.11n channel) may be used as a channel A. In some further embodiments, a WiFi "beacon frame" may be used as the broadcast packet mentioned above, while in some other embodiments, an additional WiFi management frame may be introduced to represent the broadcast packet mentioned above. In some embodiments, the WiFi channel used as a channel A may be used exclusively for proximity verification purposes; in some other embodiments, the WiFi channel used as a channel A may be used both for proximity verification purposes and for usual WiFi data transmission purposes. In the latter case, some additional measures to ensure co-existence of proximity data with WiFi data, may be implemented, as described below.

After the broadcast has been made, at block 504, the terminal 110 may wait for a reply from any devices within a range of the wireless communication. At block 506, a reply may be received from one of the devices within the communication range. In some embodiments, such a reply may come within a pre-defined time slot. For example, as shown on FIG. 4B, after the broadcast packet, there may be a plurality of time slots. When a device sends a reply within a time slot M (M being any integer from one to N), the reply may be a special packet that may be time shifted (for example, by M*time_slot_size) from when the end of the broadcast packet being sent by the terminal 110. In some embodiments, the reply may comprise some information about the device sending the reply, for example, a device id.

In some embodiments, length of time slots may be calculated in a way which ensures that replies sent by devices may not overlap regardless of position of devices, as long as the devices are within the physical range. For example, if the physical communication range is r, then time slot length may be chosen to exceed $T_{reply}+2*r/c+T_{inacc}$, in which $T_{reply}$ may be the time necessary to transmit a reply, and $T_{inacc}$ may be reserved for inaccuracies, etc. The inaccuracies may include inaccuracies similar to the variable part of $t_x$ described above. For example, if each reply takes 20 μs, the maximum inaccuracies is about 200 ns, and r=100 m (these exemplary values are expected to represent typical order of magnitude for a 802.11n communication), then 2*r/c may be around 670 ns, and the time slot length may be chosen to exceed 20870 ns, for example, as 21 μs.

After receiving the reply, at block 508, the terminal 110 may calculate a distance D from the terminal 110 to the device that has replied in the time slot M. In some embodiments, the terminal 110 may use the technique described with respect to FIG. 3C to determine the distance D. Then, based on the distance D, at block 510, the terminal 110 may identify this likely candidate device and proceed with proximity verification with this likely candidate (for example, as described with respect to FIG. 2 and/or FIGS. 3B/3C).

In some embodiments, the number of the specific time slot used by a device may be determined by some pre-defined function of the device id and information broadcasted as a part of broadcast packet.

In some other embodiments, to allow different devices 102 to select different time slots, the following approach may be used. Whenever a device 102 in FIG. 4A detects a first broadcast from the terminal 110, it may wait for all time slots to complete without transmitting anything. That is, if the broadcast and time slots after the broadcast may be referred to as a broadcast cycle, the device 102 does not reply during the first broadcast cycle. Then, the device 102 may make a random selection among the slots which were detected as "free" (without any device responding) during the first broadcast cycle, and uses this randomly selected slot to transmit its reply during the next (and subsequent) broadcast cycle(s) from the same terminal 110. There is a possibility for collision such that two devices may detected their first broadcasts at the same time and randomly select the same time slot. To address the collision issue, in some embodiments, a device 102 may monitor any collisions for its selected time slot, and when any collision is detected, the device 102 may re-select another time slot from the time slots detected as free during the previous broadcast.

It should be noted that in some embodiments, after the process described with respect to FIGS. 4A, 4B and 5 identifies a likely candidate, instead of performing the full process described with respect to FIG. 2 and FIGS. 3B/3C, the terminal 110 may request only the signed secondary value (which, as described before, may still include the nonce and value V). In these embodiments, the broadcast packet may include the nonce, and the device reply packet may include the value V.

In embodiments where WiFi channel is used as a channel A and the same channel is used for the transmission of regular WiFi data, the following mechanism may be used in some embodiments to allow for co-existence of regular WiFi data with proximity broadcasts and slots. First, before replying to a time slot in a broadcast, each of devices 102 may request a time slot number from a terminal 102 using specially introduced management frames (or extending existing WiFi management frames, for example, association/re-association request/response). This time slot request/response may happen outside of the sequence shown on FIG. 4B. Then, when a broadcast frame (which may be, for example, a beacon frame, or a specially introduced frame) is sent by the terminal 110, each of devices 102 that already has an allocated time slot may transmit its reply.

In some embodiments, if the terminal 110 realizes that certain time interval (for example, comparable to SIFS time) within a time slot allocated for a certain device 102 has already passed, but none of devices 102 has started transmission, the terminal 110 may start transmission (for example, a frame containing some random data) itself, to fill the time slot. This may be necessary to ensure that other WiFi stations, which may have missed (or do not understand) broadcast frame, and are using standard WiFi transmission rules (which in general may allow transmission if a channel is idle for a few μs), do not interfere with the proximity detection process.

Figure 6:
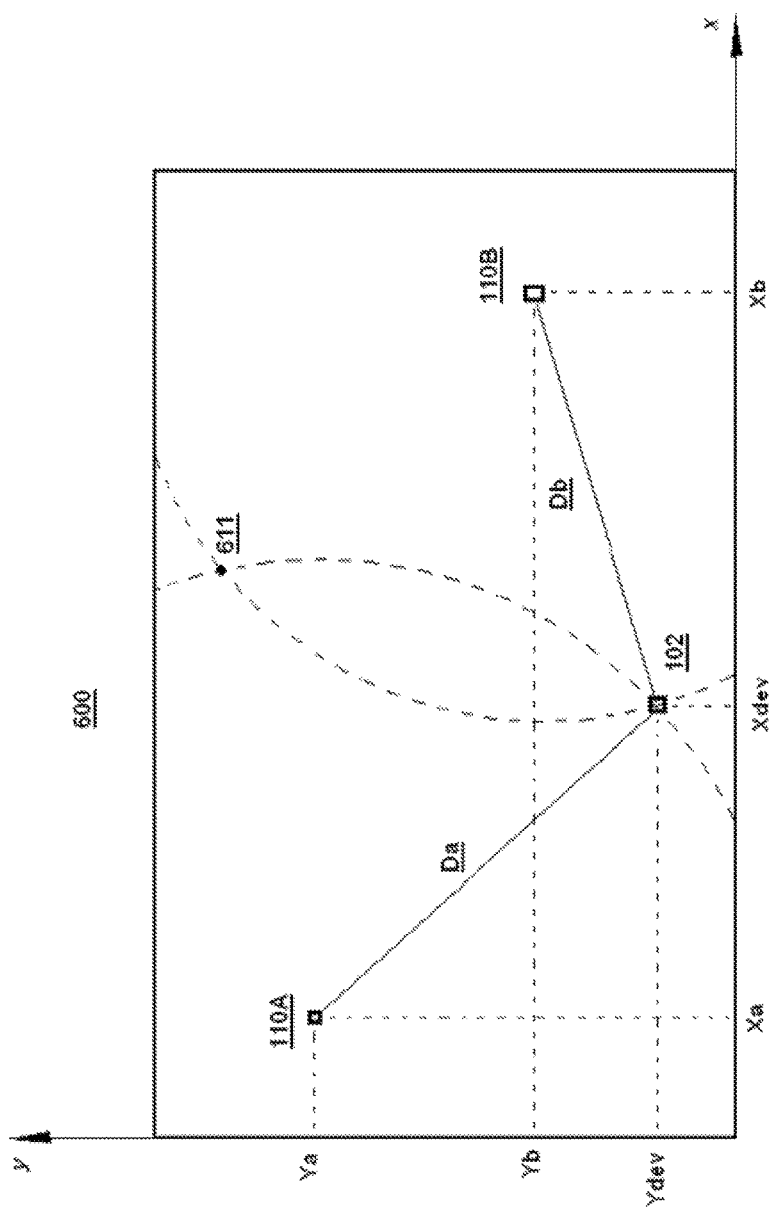
FIG. 6 is representation of another exemplary embodiment according to the present disclosure.

FIG. 6 shows a system 600 according to another exemplary embodiment of the present disclosure. The system 600 may include a device 102 and two terminals 110A and 110B. The two terminals 110A and 110B may be embodiments of the terminal 110 described above. The device 102 may perform a proximity verification procedure according to one of the techniques described above, with each of the terminals 110A and 110B. As part of the proximity verification process, each of the terminals 110A and 110B may calculate a distance D along a direct path to the device 102, shown as $D_a$ and $D_b$ in FIG. 6. Each of the terminals 110A and 110B may then send a "coordinates packet" to the device 102 comprising the distance D measured by each respective terminal as well as the coordinates of the physical location of the respective terminal by, for example, using a special WiFi management frame. In one embodiment, the coordinates representing the physical location of the terminal may be represented as World Geodetic System (WGS) 84 or any other datum. In another embodiment, the coordinates may be specific to the system 600 in which the terminals are located (e.g., coordinate axes along length and width of the room in which the system 600 is located). Thus, for example, a "coordinates packet" sent from the terminal 110A to the device 102 may comprise $X_a$, $Y_a$ (coordinates of terminal 110A) and distance $D_a$, and a "coordinates packet" sent from the terminal 110B to the device 102 may comprise $X_b$, $Y_b$, and $D_b$. In some embodiments, the terminals 110A and 110B may be populated with their respective coordinates information in advance.

Once the "coordinates packets" from both terminal 110A and 110B are received at the device 102, the device 102 may calculate its own coordinates. For example, using trilateration, $X_{dev} = X_a \, \text{sgn}(X_b - X_a) * D_a * \sin(\alpha)$ (where $\text{sgn}(\,)$ is the sign function extracts the sign of a real number); $Y_{dev} = Y_a - D_a * \cos(\alpha)$, wherein $\alpha = \arccos(Y_a - Y_b)/D_{ab}) - \arccos((D_{ab}^2 + D_a^2 - D_b^2)/(2*D_{ab}*D_a))$, and $D_{ab} = \sqrt{(X_b - X_a)^2 + (Y_b - Y_a)^2}$ is the distance between terminals 110A and 110B.

It should be noted that device 102 may communicate with terminals 110A and 110B either in parallel or sequentially. It should further be noted that in some embodiments, for example, if proximity verification is performed only for the purpose of calculating coordinates, the proximity verification messages may omit signing the secondary value. It should further be noted that in some embodiments, instead of terminal 110A and terminal 110B performing proximity verification and then reporting their respective distances and coordinates, the device 102 may perform the proximity verification with the terminals 110A and 110B and calculate the distances $D_a$ and $D_b$ (while still receiving information about $X_a$, $X_b$, $Y_a$, $Y_b$ from the respective terminals).

In some embodiments, trilateration may identify two different possible locations in which the device 102 may be located. The second possible point is shown as point 611 in FIG. 6, and the coordinates of the other point 611 may be calculated, for example, as $X_{dev} = X_b + \text{sgn}(X_b - X_a) * D_a * \cos(\beta)$; $Y_{dev} = Y_b \, \text{sgn}(X_b - X_a) * D_a * \sin(\beta)$, wherein $\beta = \arctan((Y_a - Y_b)/(X_b - X_a)) + \arccos((D_{ab}^2 + D_b^2 - D_a^2)/(2*D_{ab}*D_b))$ and $D_{ab}$ is defined as above. Various techniques may be used to address this ambiguity, and to identify the location for device 102. In some embodiments, the "coordinates packets" that each of the terminal 110A and/or terminal 110B send to device 102, may indicate a range of possible coordinates for each respective terminal; for example, the possible coordinates may be restricted to an enclosed area, such as a room in which the system 600 is located in. In such an embodiment, if both terminal 110A and 110B are located along the same wall, this may be sufficient to allow the device 102 to exclude one of the two possible location points, thus leaving only one possible location point. In some other embodiments, more than two terminals 110 may be used to determine coordinates and various methods of the trilateration may be used in this case, for example, as described in "Quality of Trilateration: Confidence based Iterative Localization," authored by Zheng Yang and Yunhao Liu, available at "http://www.cse.ust.hk/~liu/QoT.pdf;" "Minimizing Trilateration Errors in the Presence of Uncertain Landmark Positions," authored by Alexander Bahr and John J. Leonard, available at "http://ecmr07.informatik.uni-freiburg.de/proceedings/ECMR07_0073.pdf," and other trilateration techniques, both known in the art and developed in the future.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of microprocessors, microcontrollers, field programmable gate arrays (FPGAs), application specific integrated circuits (ASICs), and/or System on a Chip (SoC)—but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. An apparatus, comprising:
    a communication port; and
    circuit components configured to:
        receive a request via the communication port from a communication partner;

send a response via the communication port to the communication partner;
generate a secondary value that includes at least a portion of the request and at least a portion of the response, and a measured time interval from when the apparatus receives a last symbol of the request to when the apparatus starts sending a first symbol of the response;
generate authenticating data to authenticate the secondary value; and
send the secondary value and the authenticating data to the communication partner via the communication port, wherein the request and response are transmitted by one or more modulated signals, wherein each of the one or more modulated signals comprises one or more symbols, and the request and response are transmitted by the one or more symbols of the one or more modulated signals.

2. The apparatus of claim 1, wherein the communication port is a WiFi transceiver, and at least one modulated signal of the one or more modulated signals is a WiFi signal.

3. The apparatus of claim 1, wherein the one or more symbols are Quadrature Amplitude Modulation (QAM) symbols.

4. The apparatus of claim 1, wherein the one or more symbols are orthogonal frequency-division multiplexing (OFDM) symbols.

5. The apparatus of claim 1, wherein the communication port is configured to use half-duplex communication to receive the request and send the response.

6. The apparatus of claim 1, wherein the circuit components are further configured to prepare the response in advance and to start sending the response at a time based on timing of the received one or more symbols of the request.

7. The apparatus of claim 1, wherein the circuit components are further configured to start preparation of the response at a time based on timing of the received one or more symbols of the request, to calculate time spent on preparation of the response, and to generate the secondary value at least in part based on the calculated time spent on preparation of the response.

8. A method for an apparatus to ensure its proximity to a wireless communication partner, comprising:
receiving a request from the communication partner via a communication port of the apparatus;
sending a response via the communication port to the communication partner;
generating a secondary value that includes at least a portion of the request and at least a portion of the response, and a measured time interval from when the apparatus receives a last symbol of the request to when the apparatus starts sending a first symbol of the response;
generating authenticating data to authenticate the secondary value; and
sending the secondary value and the authenticating data to the communication partner via the communication port, wherein the request and response are transmitted by one or more modulated signals, wherein each of the one or more modulated signals comprises one or more symbols, and the request and response are transmitted by the one or more symbols of the one or more modulated signals.

9. The method of claim 8, wherein the communication port is a WiFi transceiver, and at least one modulated signal of the one or more modulated signals is a WiFi signal.

10. The method of claim 8, wherein the one or more symbols are Quadrature Amplitude Modulation (QAM) symbols.

11. The method of claim 8, wherein the one or more symbols are orthogonal frequency-division multiplexing (OFDM) symbols.

12. The method of claim 8, wherein the request is sent and the response is received by half-duplex communication.

13. The method of claim 8, further comprising:
preparing the response in advance; and
starting to send the response at a time based on timing of the received one or more symbols of the request.

14. The method of claim 8, further comprising:
starting preparation of the response at a time based on timing of the received one or more symbols of the request;
calculating time spent on preparation of the response; and
generating the secondary value at least in part based on the calculated time spent on preparation of the response.

* * * * *